May 7, 1957 J. A. MAIN 2,791,296
WHEEL BRAKE
Filed Jan. 7, 1954 2 Sheets-Sheet 1

INVENTOR.
JOHN A. MAIN.
BY

May 7, 1957 J. A. MAIN 2,791,296
WHEEL BRAKE
Filed Jan. 7, 1954 2 Sheets-Sheet 2
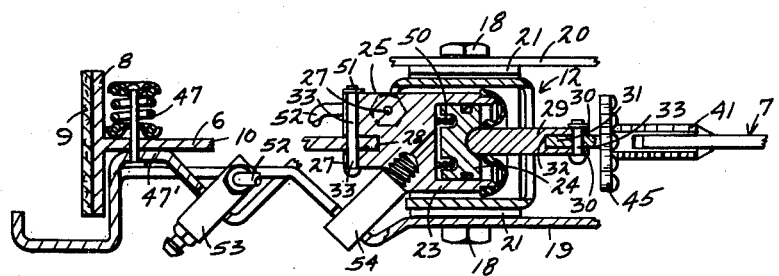
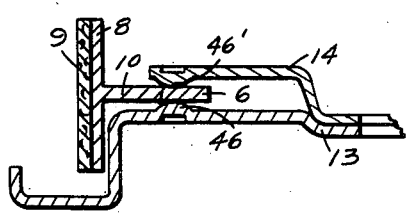
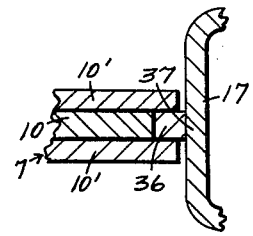
INVENTOR.
JOHN A. MAIN.
BY United States Patent Office 2,791,296
Patented May 7, 1957

2,791,296
WHEEL BRAKE

John A. Main, Birmingham, Mich., assignor to Kelsey-Hayes Company, a corporation of Delaware Application January 7, 1954, Serial No. 402,685

3 Claims. (Cl. 188—78)

The invention relates to brakes and refers more particularly to vehicle wheel brakes of the type employing an internal friction device.

The invention has for one of its objects the provision of an improved brake which is so constructed that it requires relatively low manual applying pressure, and is powerful in operation and at the same time enables the use of a brake drum of relatively small diameter without disturbing the wheel or axle structure within the brake.

The invention has for another object the provision of an improved brake in which the separable ends of the friction device are adapted to be spread apart to move the friction device into engagement with the brake drum by fluid pressure actuated means, after which, thrust is adapted to be transmitted from the trailing to the leading ends of the friction device by pivotal lever means having the axis of its mounting pivot located radially inside the axis of the fluid pressure actuated means.

These and other objects of the invention will become apparent from the following description taken in connection with the accompanying drawings in which—

Figure 1:
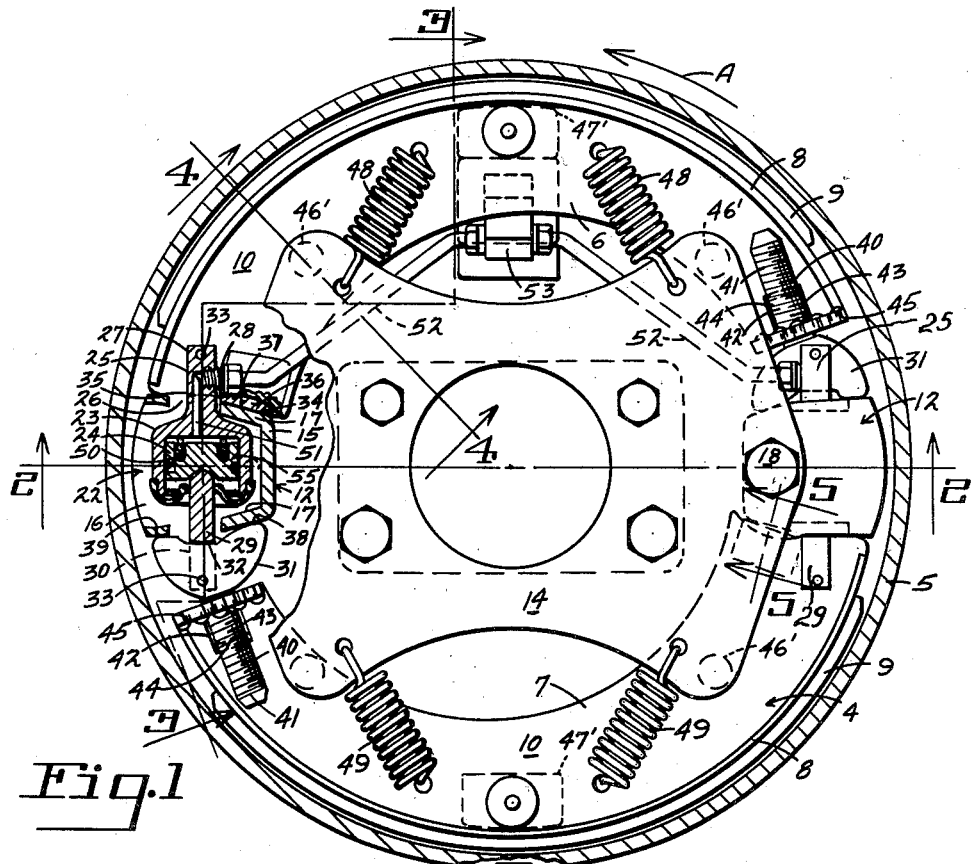
Figure 2:
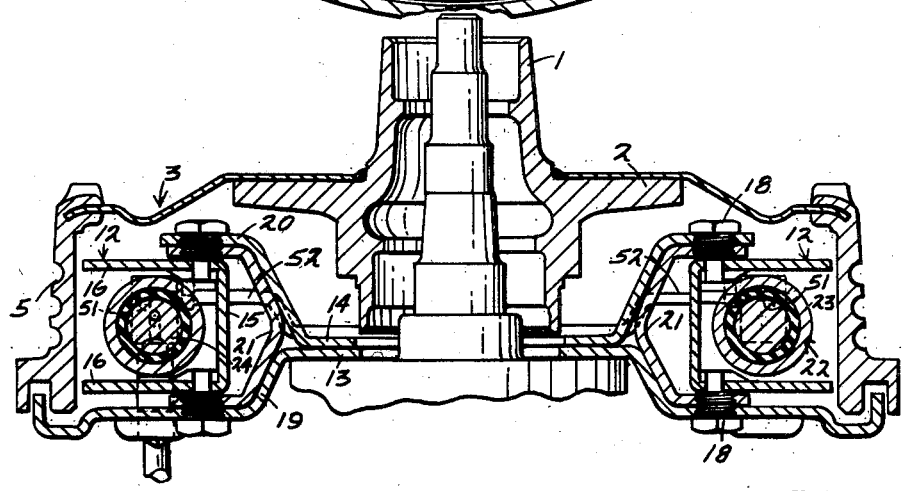

Figure 1 is a side elevation partly broken away and in section of a brake embodying the invention;

Figures 2, 3, 4 and 5 are cross sections of the lines 2—2, 3—3, 4—4 and 5—5, respectively, of Figure 1.

The brake illustrated in the drawings is designed for use with a vehicle wheel and more particularly a motor vehicle wheel having the hub 1 provided with the fixed radial flange 2 to which the wheel body is detachably secured. The brake comprises the brake drum 3 and the friction device 4 within the drum and engageable with the radially inner surface of its annular brake flange 5. The friction device comprises the pair of upper and lower brake shoes 6 and 7 which are alike, each brake shoe being of T-cross section and having the arcuate flange or rim 8, the brake lining 9 secured to the rim, and the radial flange or web 10 extending radially inwardly from the rim. The shoes have separable spaced adjacent ends between which are located the thrust transmitting levers 12. Each lever extends between and engages adjacent ends of the shoes and is pivotally mounted on a mounting comprising the backing plate 13 and the associated plate 14, these plates being fixedly secured to either a fixed radial flange on the rear axle housing of the motor vehicle or a fixed radial flange of the front steering spindle of the motor vehicle.

Each lever is box-shaped with a radially outer open end and has the bottom 15, the integral side walls 16 and the integral apertured end walls 17. The pivot for each lever is formed of the axially aligned gudgeons 18 which have intermediate portions threaded into the spaced portions 19 and 20 of the backing plate 13 and associated plate 14, respectively, and also have reduced end portions extending through the side walls 16 and on which these side walls are journalled. 21 is a channel-shaped reinforcing member between the portions 19 and 20 and also threadedly engaged by the gudgeons.

For the purpose of initialy applying the brake by moving the brake shoes against the brake drum, I have provided the fluid pressure actuated devices 22. Each device is a wheel cylinder comprising the cylinder 23 and the piston 24 slidable within the cylinder. The cylinder is open at one end and has extending from its other end the projection 25 passing through the opening 26 in an end wall 17 of a lever and operatively connected to a shoe, the projection having at its outer end the furcations 27 and the rounded abutment 28 between the furcations. 29 is a rod passing through an opening in the other end wall of the lever and having a partly spherical inner end fitting a recess in the piston 24 and also having at its outer end the furcations 30 and the rounded abutment 32 between the furcations. The two fluid pressure actuated devices or wheel cylinders 22 are so arranged that the projections 25 extend upwardly and the rods 29 extend downwardly.

Assuming the drum to be rotating in the direction of the arrow A shown in Figure 1 during forward movement of the motor vehicle, the furcations 27 of the projection of the left-hand cylinder embrace and the abutment 28 engages the trailing end of the upper shoe 6. The furcations 27 of the projection of the right-hand cylinder embrace and the abutment 28 engages the head 31 of an adjustment device at the leading end of the upper shoe 6. Also, the furcations 30 of the rod of the left-hand wheel cylinder embrace and the abutment 32 engages the head of a second adjustment device at the leading end of the lower shoe 7 and the furcations 30 of the rod of the right-hand wheel cylinder embrace and the abutment 32 engages the web of the lower shoe 7 at its trailing end. The furcations 27 and 30 are loosely pivotally connected to the shoe webs and adjustment device heads by the pins 33. Each of the trailing ends of the two shoes is formed with the radially inner arcuate concave bearing 34 and the radially outer convex bearing 35, and the pad or button 36 is provided having an arcuate convex outer surface fitting the concave bearing 34 and a plane inner surface slidably engaging the radially inner abutment portion 37 of the adjacent end wall 17 of the lever 12. For holding each pad or button 36 in place there are the sides plates 10' secured to the sides of the webs 10 of the shoes and extending at opposite sides of each pad or button.

The head 31 of each adjustment device has the radially inner and radially outer convex bearings 38 and 39, respectively, engaging the radially inner and the radially outer abutment surfaces of the adjacent end wall of the lever. The head 31 is preferably formed integrally with the stem 40, which has the furcations 41 embracing the web of the associated shoe and the solid portion 42 provided with opposite flat faces slidable in the opening 43 in the web and formed at its outer end between the furcations with the surface 44 clearing the end of the opening. 45 is an adjusting wheel adjustably threaded on the portion 42 and abutting the end of the web. The construction of the adjustment device is the same as that of the co-pending patent application Serial No. 272,010, filed February 18, 1952, in the name of Charles W. Sinclair, now Patent No. 2,701,628.

The shoes 6 and 7 are guided by means of the bosses 46 and 46' engaging opposite sides of the shoe webs and located on the backing plate 13 and the associated plate 14, respectively, and also by means of the hold-down springs 47 holding intermediate portions of the shoe webs against the bosses 47' on the backing plate. Also, the shoes are normally held in their retracted positions and against the abutment portions of the levers by the upper and lower pairs of coil springs 48 and 49, respectively, each having one end connected to a shoe web and the other end connected to the portion of the plate 14 radially inwardly of a boss 46'. To hold each piston 24 against its rod 29, I have provided the coil spring 50 between each cylinder and its piston.

The projections 25 are formed with the passages 51 communicating with the interiors of the cylinders and these passages are connected by the tubing 52 to the bleed valve fitting 53, mounted on the upper portion of the backing plate 13. One of the cylinders is provided with the inlet fitting 54 which is adapted to be connected to a suitable source of braking liquid under pressure, such as a master cylinder.

In operation, assuming the motor vehicle to be moving forwardly and the brake drum to be rotating in the direction of the arrow A in Figure 1, it will be seen that, when the braking liquid under pressure is forced into the wheel cylinders 22, the cylinders 23 and pistons 24 are forced away from each other to spread apart the adjacent separable ends of the shoes 6 and 7 after which the shoes will be moved circumferentially by the drum 3 and their trailing ends will operate through the pads 36 upon the radially inner abutment portions 37 of the levers 12 to rock these levers in a counterclockwise direction about the axes of their pivots formed by the gudgeons 18. The radially outer abutment portions of the opposite end walls of the levers engage the radially outer bearings 39 of the adjustment devices to thereby transmit thrust from the trailing ends of the shoes to the leading ends. It will be noted that the centers 55 of curvature of the outer surfaces of the pads 36 are radially outside the axes of the pivots of the levers and that the ratio of the leverages is such that but a part of the thrust is transmitted from the trailing to the leading ends of the shoes. The adding of force resulting from torque continues until the levers can no longer swing at which time the levers cooperate with the drum and shoes to anchor the shoes.

From the above description, it will be seen that the brake and more particularly the mechanism for applying the brake is compactly arranged with the wheel cylinders extending within the levers and radially outwardly of the axes of the lever pivots so that a relatively small brake drum may be used. It will also be seen that the brake may be applied under relatively low manual pressure and is powerful in operation.

What I claim as my invention is:

1. A brake comprising a brake drum, a mounting, a friction device within and engageable with said drum, said friction device being movable circumferentially by said drum and having separable ends, fluid pressure actuated means for spreading apart said ends to move said friction device into engagement with said drum, lever means between said ends having portions abutting said ends to transmit thrust from the trailing to the leading ends in response to circumferential movement of said friction device, and fulcrum means supporting said lever means on said mounting radially inwardly of said fluid pressure actuated means.

2. A brake comprising a brake drum, a mounting, a pair of brake shoes within and engageable with said drum, said shoes being movable circumferentially by said drum, wheel cylinders for spreading apart the adjacent ends of said shoes to move said shoes into engagement with said drum, levers between said adjacent ends having portions abutting said adjacent ends to transmit thrust from the trailing ends of said shoes to the leading ends of said shoes in response to circumferential movement of said shoes, said wheel cylinder extending between said abutting portions of said levers, and fulcrum means supporting said levers on said mounting radially inwardly of said wheel cylinders.

3. A brake comprising a brake drum, a mounting, a pair of brake shoes within and engageable with said drum, said shoes being movable circumferentially by said drum, wheel cylinders for spreading apart the adjacent ends of said shoes to move said shoes into engagement with said drum, levers between said adjacent ends having portions abutting said adjacent ends to transmit thrust from the trailing ends of said shoes to the leading ends of said shoes in response to circumferential movement of said shoes, said wheel cylinder extending between said abutting portions of said levers, and means pivotally mounting said levers on said mounting radially inwardly of said wheel cylinders, said levers and the pivotal mounting means therefor cooperating with said drum and shoes to anchor said shoes in response to continued turning of said levers about the axes of said pivotal mounting means.

References Cited in the file of this patent

UNITED STATES PATENTS

| 2,122,296 | Russell | June 28, 1938 |
|---|---|---|
| 2,150,991 | Schnell | Mar. 21, 1939 |
| 2,407,487 | Forbes | Sept. 10, 1946 |
| 2,657,768 | Hunyady | Nov. 3, 1953 |